United States Patent [19]

Bowerman

[11] 4,044,377
[45] Aug. 23, 1977

[54] VIDEO TARGET LOCATOR

[75] Inventor: Edwin R. Bowerman, Topsfield, Mass.

[73] Assignee: GTE Laboratories Incorporated, Waltham, Mass.

[21] Appl. No.: 680,832

[22] Filed: Apr. 28, 1976

[51] Int. Cl.² .................... H04N 7/18; G01C 3/08; G01C 3/32
[52] U.S. Cl. .................... 358/107; 356/21; 235/92 MT
[58] Field of Search .......... 178/DIG. 1, DIG. 36, 178/6.8; 358/101, 107; 356/21; 235/92 MT

[56] References Cited

U.S. PATENT DOCUMENTS

| | | | |
|---|---|---|---|
| 2,999,944 | 9/1961 | Laycak | 178/DIG. 36 |
| 3,567,853 | 3/1971 | Green | 178/DIG. 36 |
| 3,619,499 | 11/1971 | Petrocelli | 178/DIG. 36 |
| 3,783,189 | 1/1974 | Nelson | 178/DIG. 36 |
| 3,952,150 | 4/1976 | Gerardin | 178/DIG. 36 |
| 3,961,851 | 6/1976 | Gerharz | 178/DIG. 36 |

*Primary Examiner*—Howard W. Britton
*Attorney, Agent, or Firm*—Irving M. Kriegsman; Robert A. Seldon

[57] ABSTRACT

A closed circuit TV camera with a fixed focus lens, is used to measure the vertical displacement from and longitudinal distance from an industrial robot arm to checkered-row target pattern, i.e., a row of alternate black and white squares. The pattern is located in a fixed spatial relationship with a targeted object and is identified by the appearance of a burst of pulses in the video output during the horizontal scan. The vertical displacement of the target pattern from the optical axis of the camera is obtained by averaging the vertical deflection voltages, when the pattern is first acquired and when the pattern is just lost. The longitudinal distance to the target plane is obtained from the pulse repetition frequency within the burst, which increases linearly with distance. Harmonics of the fundamental burst frequency, which might result in ambiguity for far-to-near distance ratios exceeding two, are suppressed by a supplemental cylindrical lens which defocusses the image only along the line of scan without altering the top and bottom edge definition of the target.

14 Claims, 7 Drawing Figures

VIDEO TARGET LOCATOR

FIELD OF THE INVENTION

This invention relates to computer controlled servo-mechanisms, commonly referred to as industrial robots. These robots are increasingly extending automation to many jobs characterized by highly repetitive operations. These jobs, which require only a small part of the human intellectual capabilities of the average skilled worker, are increasingly hard to fill as the educational level and expectations of new workers increase. In order to automate these processes, feasible machine substitutes for the human senses are required. Specifically, an industrial robot must be capable of locating and tracking the object to be manipulated.

This invention further relates to a target locator for use with industrial robots. In some robot applications, uncertainty exists as to the location of the place where the robot must pick up or put down a targeted object. This can occur, for example, if the objects are hanging from a monorail conveyor carrier where large variations in the spacing between hangers may occur when chain links are removed to take up the slack resulting from the stretching of the chain during use. In such a case, a non-contact compensating means is desirable for computing the lateral and longitudinal displacement of the object from the robot arm to thereby correct the robot's location or timing so that the robot and target may be synchronized. In a different application, a target locator could be used to supervise a plurality of object carrying conveyors and to direct the robot arm to the specific conveyor carrying the closest object.

SUMMARY OF THE INVENTION

It is, therefore, an object of the present invention to provide a non-contacting means of measuring the longitudinal and lateral displacement of a target from a station point.

It is another object of the invention to generate an error signal by which the robot may track and locate a targeted object.

It is a further object of the invention to provide a target locator capable of synchronizing a robot with variably spaced objects carried by a conveyor.

It is a still further object of the invention to provide a target locator capable of supervising a number of conveyors and directing a robot arm with respect thereto in accordance with a given priority.

These and other objects of the invention are attained by a target locator which locates a targeted object and generates a signal representative of the target distance from a station point, which may conveniently be the robot arm. The target locator comprises a target pattern of successive spaced-apart markings having a predetermined spatial relationship with the target, and video signal generating means including a photosensitive medium, optical means located at the station point for imparting a light-value related, electrostatically charged image of the target pattern onto the photosensitive medium when the target is in the viewing plane of the optical means, and first scanning means for periodically directing a scanning beam over the imaged photosensitive material and along at least one scanning path. The image formed by the optical system on the photosensitive material is perspectively scaled with respect to the pattern in at least one direction in accordance with the longitudinal target distance from the station point. The scan path is in a generally parallel direction with the direction of the scaling so that the video signal generating means is responsive to a scanned marking image to vary the video signal magnitude for a time interval which varies inversely with target distance. Means responsive to the interval length or, alternatively, to the frequency of the magnitude variations are accordingly provided to indicate the target distance and generate a corresponding signal.

Another aspect of the invention is the generation of a signal representing the lateral displacement of the targeted object from the robot arm. A sweep voltage utilized to deflect the scanning beam in an essentially perpendicular direction to the scan path and synchronized with the scanning means to define a scan field having a plurality of essentially parallel paths, is sampled when the imaged markings are both initially and lastly detected in the field. The two voltage values are then averaged to generate a signal indicative of the lateral displacement of the target.

Still another aspect of the invention relates to the slight defocussing of the optical system with respect to the target pattern in a generally parallel direction with that of the scan. The consequential generating of a burst having a generally sinusoidal waveform, rather than a square wave in response to scanning markings, substantially eliminates undesirable harmonics from the video signal.

These and other aspects and advantages of the invention are more fully described in the following detailed description in conjunction with the accompanying drawings.

DESCRIPTION OF THE PREFERRED EMBODIMENT

Figure 1:
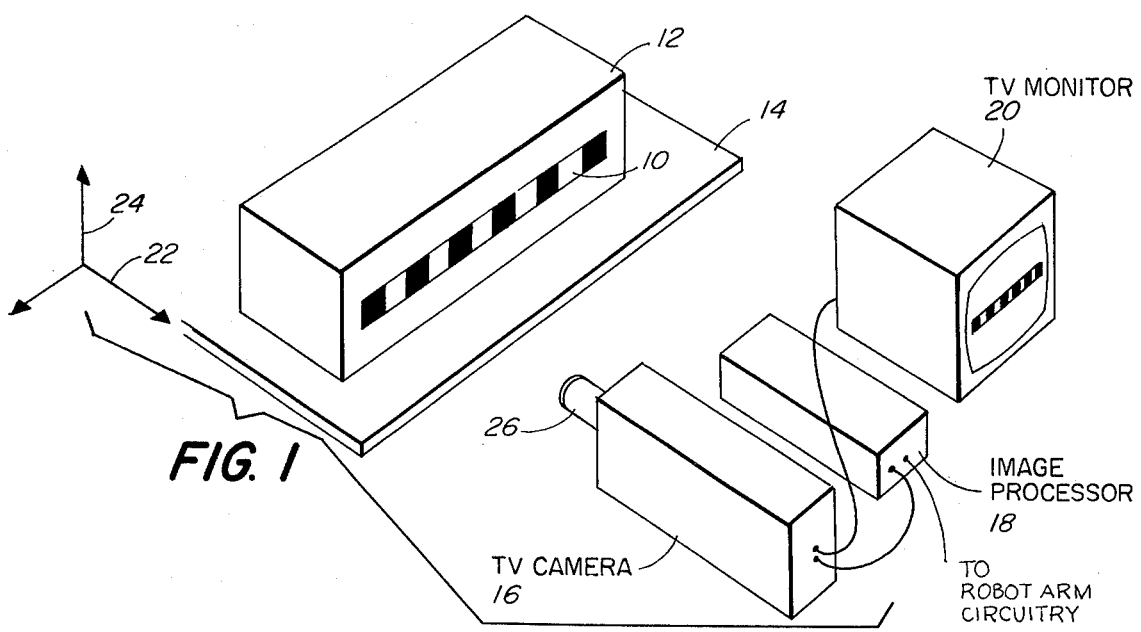
FIG. 1 is a pictorial representation of a target locator made in accordance with the invention.

FIG. 1 is a pictorial representation of a target locator made in accordance with the invention. A target pattern 10 of successive spaced-apart markings, such as a horizontal row of black and white squares, is shown affixed to an object 12 carried by a conveyor 14. The object 12 has been brought into the viewing field of a video signal generating device such as a closed circuit TV camera 16, which may be mounted on a robot arm (not shown). Associated with the camera 16 is a TV monitor 20 generally known in the art, and an image process 18 which will be described later in greater detail with reference to FIG. 6. The conveyor 14 may be moving in a longitudinal plane, as indicated by the arrow 22, or in a lateral plane, as indicated by the arrow 24. In either case, the target locator will locate and track the target and accordingly provide the robot arm with directional information necessary to pick up or put down the object at the targeted location.

The operation of the camera 16 is known in the art, but features pertinent to the subject invention will be briefly described for the sake of clarity. Video cameras include a photosensitive material and an optical system, such as lens 26, for producing an image of its viewing field thereon. An electrostatic charge distribution related to the luminance level distribution of the viewed scene, is accordingly imparted to the material and will hereinafter be referred to as the "image".

An electric signal containing information about the image, and therefore the viewing object, is generated by means, such as the camera tube, for systematically scanning the imaged area. A scanning spot, defined by a focussed electron beam is allowed to impinge on the charged surface of the photosensitive material and moved in a systematic manner to sample the entire area occupied by the image. The magnitude of the video signal generated by the camera is determined at each instant by the charge density associated with the image at the instantaneous position of the scanning spot.

The conventional raster scanning pattern utilized to systematically sample the imaged area comprises a plurality of essentially parallel spaced paths, or lines, formed by repeatedly sweeping the scan spot across the imaged area every 1/15,750 seconds in a "fast" direction, while deflecting the spot in an essentially perpendicular "slow" direction every 1/60 second via a gradually increasing deflection voltage having a generally saw-tooth waveform with a period of 1/60 second.

When the spot has completed a line, it is returned to its initial position, but owing to the deflection voltage is transversely offset with respect to the completed line. The plurality of lines formed by the scanning of the entire image area are referred to as a field. Upon completion of the field, the deflection voltage is reset and the area is rescanned. It may also be noted that during the retrace interval at the completion of each line, as well as at the completion of the field, the scanning beam is prevented from impinging on the photosensitive material so that scanning is performed in a unidirectional manner.

Although the particular scan pattern utilized is not important to the invention, the conventional raster described briefly above, and in more detail below, will be illustratively used.

Figure 2:
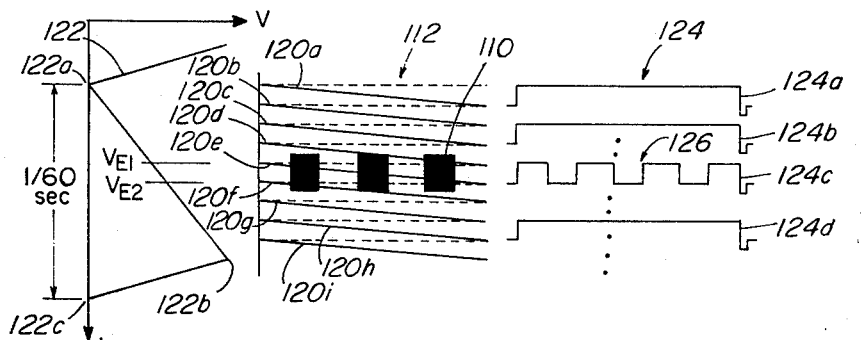
FIG. 2 is an illustration of the manner by which the imaged target pattern may be scanned to generate a video signal indicative of the longitudinal target distance, and its lateral displacement, from the robot arm.

Having briefly reviewed the pertinent characteristics of the camera 16, attention is now directed to the operating principle of the target locator as illustrated in FIG. 2.

FIG. 2 is an illustration of the manner by which the target pattern image may be scanned to generate a video signal indicative of the target distance. FIG. 2 should be viewed in conjuncton with FIG. 1 for clarity.

The target pattern 10, (FIG. 1), is located within the viewing field of the camera 16 so that an image 110 is projected onto the photosensitive material 112. The image 110 is scanned in the manner described above along a plurality of essentially parallel lines 120a-e. The "fast scan" direction of the camera is oriented horizontally to scan in a direction through the successive imaged markings, and its "slow" direction is consequently vertical. It is obvious, however, that the target and scan axes may be rotated together or with respect to each other; optimization is achieved, however, when the "fast" scan direction of the camera is parallel to the direction of the markings.

As described above, the vertical deflection of the scanning spot is controlled by a vertical deflection voltage 122 shown graphically at the left of FIG. 2. The deflection voltage 122 gradually increases from an initial value 122a to a maximum value 122b, to cause the scanning spot to scan the entire image area, and recovers to the initial value as at 122c so that the field may be rescanned.

The generated video signal 124a-e is graphically illustrated for each scan line at the right of FIG. 2. In practice, the waveform is more complex owing to the inclusion of sync and equalizing pulses and, if appropriate, color information but for the sake of simplicity, only the monochromatic information generated during the horizontal scan is illustrated.

Figure 3:
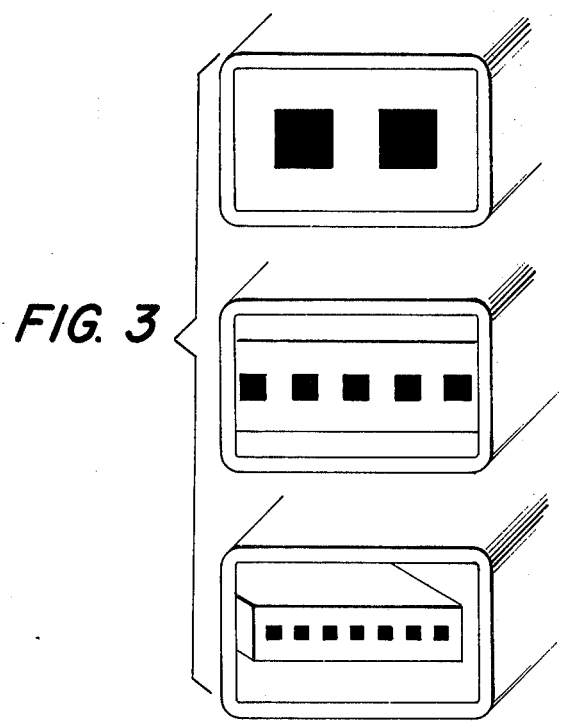
FIG. 3 is a pictorial illustration of the imaged target pattern at various target distances.

The magnitude of the waveform 124 varies with the luminosity of the imaged object. In practice, most objects appear as various shades of gray so that the video signal magnitude varies between a "pure white" level, and a "pure black" level. If the target pattern 10 comprises a row of horizontally spaced alternate black and white squares, the scanning of the pattern will generate a pulse burst 126, the frequency of which varies inversely with the pitch, TP, of the imaged pattern. As will be shown below, an essentially linear relationship between the target distance and the pitch image consequently enables the former to be calculated from the burst frequency. The relationship between the pitch image and target distance may be visually appreciated with reference to FIG. 3, wherein a video monitor illustratively reproduces the image showing the change in pitch for various target distances, and may be quantitatively defined by reference to FIG. 4.

Figure 4:
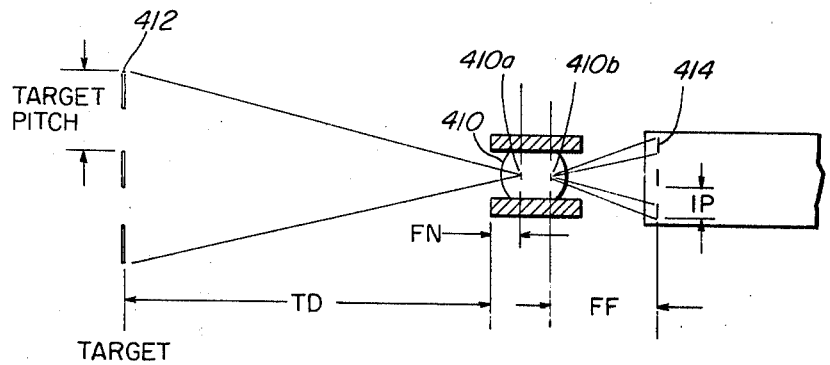
FIG. 4 is a schematic representation of an optical system utilized by the target shown in accordance with the invention.

FIG. 4 is a schematic representation of an optical system utilized by the target locator according to the invention. In the illustrated system, a lens 410 is shown having a focus which is fixed at a compromise distance (FF) so that it is equally out of focus at each end of the viewing range. A target pattern 412 having a pitch TP is located in the viewing field of the lens 410, which projects an image 414 of the pattern onto a photosensitive surface.

An essentially linear relation between longitudinal target distance (TD) and the image pitch (IP) may be shown. In the lens 410 having first and second nodal points 410a, 410b, it is known from optical theory that:

$$IP = \frac{TP \cdot FF}{TD + FN}$$

Figure 5:
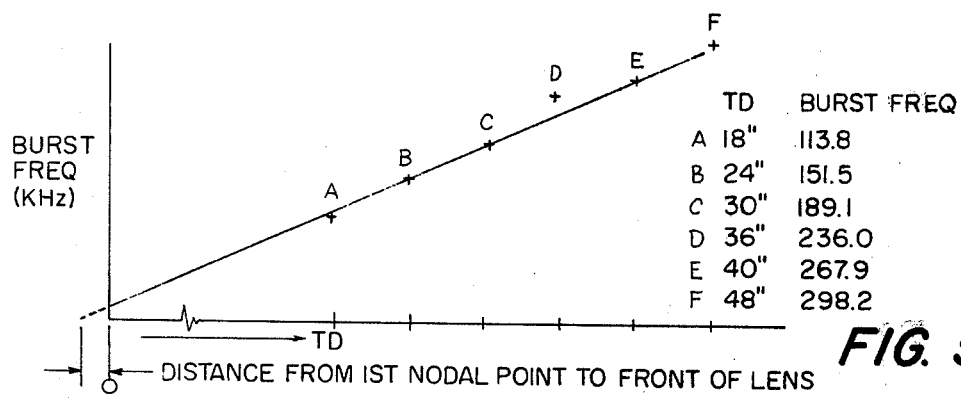
FIG. 5 is a graphic illustration showing the burst frequency of the generated video signal as a function of the target distance.

Equation 1

$$IP = \frac{FF}{TD} \cdot TP = K_P \cdot TP \quad (\text{If } FN << TD)$$

where: $TD$ = target distance from front of lens
$FN$ = distance from front of lens to first nodal point
$K_p$ = scale constant The scanning of the target image and generation of a burst indicative of the image pitch therefore also provides a signal having an essentially inversely proportional relationship with the longitudinal target distance. The function is graphically shown in FIG. 5, utilizing a video pick-up camera with a 16 mm lens and a target pattern consisting of 9 white ¾ inch squares, spaced ¾ inch apart on a black background.

Having determined the longitudinal target distance in the aforedescribed manner, it may be additionally desirable to determine its lateral displacement from the robot arm. This may be most easily performed by determining the lateral displacement of the center of the target pattern.

Referring now to FIG. 2 and with particular attention to the deflection voltage waveform 122, attention is turned to the manner by which the pattern center may be determined. The voltage 122 is sampled and held when, and if, the target pattern is first scanned ($V_{E1}$), and averaged with the value of the voltage when the target is last scanned ($V_{E2}$). The location of the target center (TC) may be accordingly expressed as:

$$TC = \frac{V_{E1} + V_{E2}}{2} = K \cdot (V_{E1} + V_{E2}) \quad \text{Equation 2}$$

Utilization of the pattern center is preferable to the use of its top or bottom edges alone in that any errors resulting from a tilting of the pattern generally offset each other when the two lines are thus averaged. The circuitry by which this, and the foregoing techniques, may be provided is shown in FIG. 6.

Figure 6:
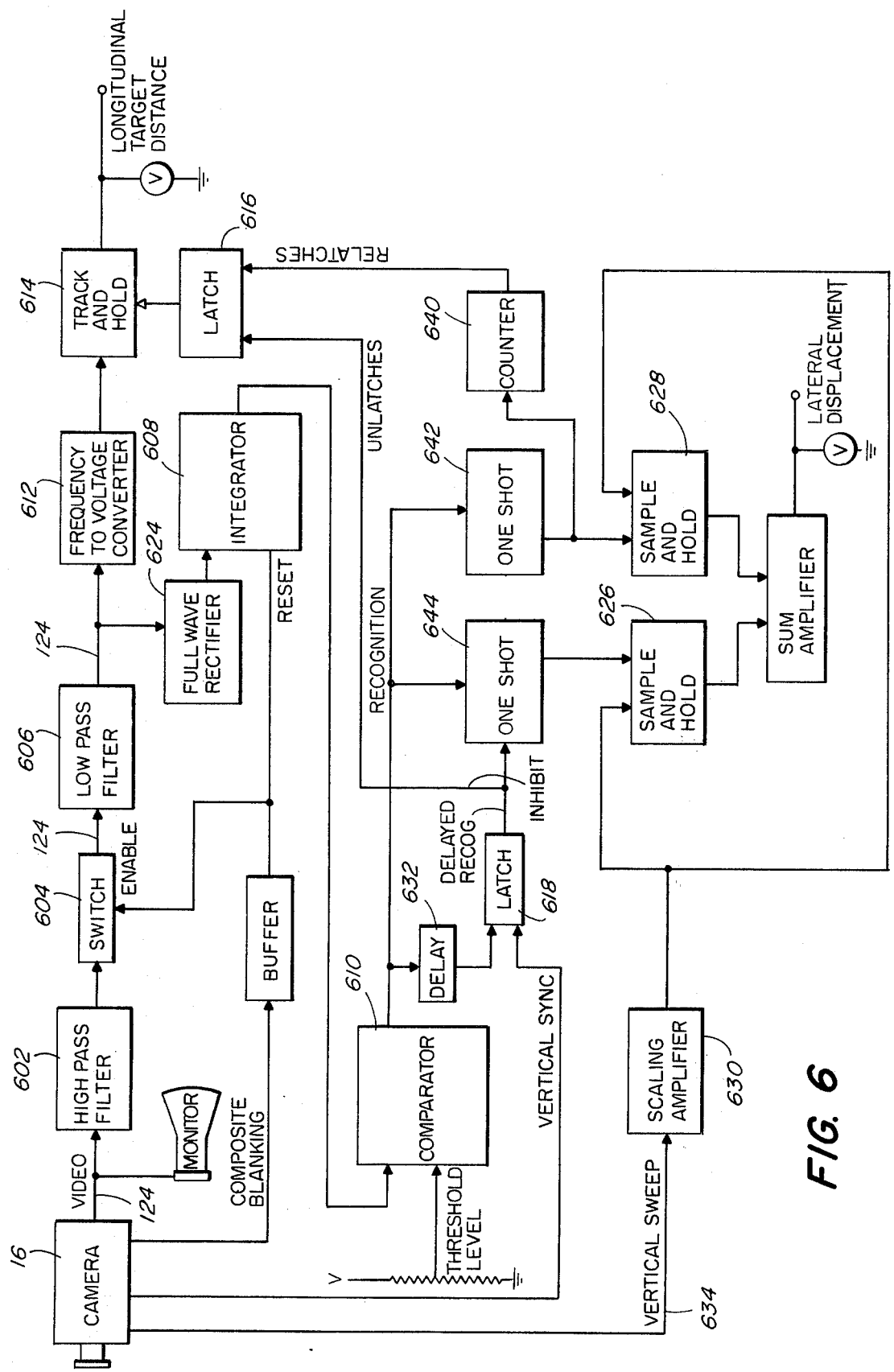
FIG. 6 is a block diagram of the image processor utilized to extract the distance and lateral displacement information from the video signal.

FIG. 6 is a block diagram of the image processor 18, (FIG. 1) used to extract the distance and lateral displacement information from the video signal. For clarity, previously described elements have been identified by their previous numerical designations.

The video signal 124, generated by the camera 16, is first preconditioned by a high pass filter 602 which removes most of the fundamental horizontal sweep and sync frequencies from the video spectrum. Further attention of these undesired frequencies is obtained by either open-circuiting or grounding the video signal by means of switch 604 during the interval between horizontal scans in which the sync pulses are generated. The useful video signal 124 may be subsequently passed through a low pass filter 606 to reduce noise and emerges therefrom having essentially the information content and waveform of the video signal portion illustrated in FIG. 2.

Accordingly, the longitudinal distance of the target is determined by applying the signal 124 to the input of a frequency/voltage converter 612 to provide an analog signal useful for control of the robot arm. To prevent jittering of the robot arm by randomly generated pulses, it is desirable to selectively activate the arm only during time intervals within the scan line in which the target pattern is actually scanned. A track and hold circuit 614 is therefore coupled between the converter 612 and the robot arm and selectively "enabled" by a latch 616 to track the converter 612 output during those intervals, while subsequently holding the converter output level until the pattern is scanned again. As will be more fully described, the latch 616 is triggered by a target recognition circuit and is reset by the output pulse of a preset counter 640 when the pattern has been successively scanned a predetermined number of times.

Recognition of the target is provided by the coupling of an integrator/comparator combination to the video signal 124. A full wave rectifier 624 is AC coupled to the video signal 124 in order to remove the DC carrier component therefrom. An integrator 608 coupled to the rectifier 624 output thereby integrates only the AC component of the signal 124, i.e., the pulse burst 126 indicative of the scanned pattern. A time-constant established by the integrator 608 insures that the target has indeed been scanned by requiring a burst of at least five pulses to raise its output, in a stepped manner, above the threshold of a comparator 610 connected to the integrator 608 output.

The comparator 610 accordingly generates a "target recognition" signal which subsequently "enables" the track and hold circuit 614 for the reasons outlined above. The "recognition" signal additionally activates the circuitry utilized to determine lateral target displacement.

In the broadest sense, the lateral displacement circuitry comprises means for moving the scanning beam of the camera 16 in an essentially perpendicular direction to that of the scan path, and means responsive to the video signal for generating a signal indicative of the perpendicular displacement of the scanning beam when the pattern image is scanned. Many techniques may be utilized. For example, in the application illustrated in FIG. 1, the camera 16 may simply scan in one direction, i.e., horizontally, and be physically moved in the perpendicular direction (vertically). A signal indicative of the camera position may be sampled when the pattern is scanned and utilized to determine the relative lateral position of the target. It may be appreciated that the circuitry may be arranged so that the signal may be sampled when the pattern is initially scanned, last scanned, and/or at intermediate points.

In the preferred embodiment of the invention, however, the camera 16 has, as earlier indicated, a "fast" and a "slow" scan direction so that lateral target displacement may be determined from the sweep voltage which controls the slow scan. Accordingly, the "target recognition" signal generated by the comparator 610 additionally "enables" the lateral displacement circuitry by respectively enabling a pair of sample and hold circuits 626, 628 through a pair of one-shots 644, 642. The sample and hold circuits 644, 642 sample and hold the valve of the vertical sweep voltage 122 applied thereto through a scaling amplifier 630, which taps the camera 16 sweep circuitry via line 634 and scales the sweep voltage value in accordance with equation 2 above.

After the sample and hold circuit 626 has been "enabled", it is quickly disabled for the remainder of the vertical scan so as to retain a value indicative of the scan line at which the pattern is initially acquired. This is conveniently accomplished by applying the "target recognition" signal in a time-delayed manner to the "inhibit" terminal of one-shot 644 through a latch 618. It may be seen that a vertical sync pulse, generated within the camera 16 at the end of the vertical scan, resets the latch 618 so that the sample and hold 626 may acquire an updated value during the following vertical scan.

Once the sample and hold 626 is disabled, only the sample and hold 628 is updated each time the pattern is horizontally scanned during the remaining portion of the vertical scan, the last upgrading occurring when the target is last recognized. The values contained within the sample and holds 626, 628 are summed in accordance with equation 2 to generate a signal indicative of lateral target displacement.

It may be appreciated by one skilled in the art that other less preferable techniques for determining lateral displacement are possible. For example, the sweep voltage may be sampled only once per vertical scan at any scan line containing the target and the sampled value utilized to approximate the target displacement. Alternatively, the one-shot 644, the sample and hold 626 and the summing amplifier 646 could be eliminated and the robot arm made responsive to sample and hold 628. In either case, lateral target displacement would consequently be determined from the location of the top or bottom edges of the pattern, rather than the pattern center, and as indicated above, errors generated by pattern tilt would not be compensated for.

In addition to the enabling of sample and hold 628, the one-shot 642 also pulses the counter 640 each time the pattern is identified. The counter 640 may accordingly be preset so that a pulse is emitted after a predetermined number of recognition signals: conveniently one half the total number of recognition signals from the comparator 610 during a vertical scan. The emitted pulse from the counter may re-latch the latch 616 to enable the track and hold 614 to hold the "longitudinal distance" value pending the next target scan.

A sample and hold circuit may be alternatively substituted for the track and hold circuit 614, and directly enabled by the counter 640, thereby eliminating the need for the latch 616.

The counter 640 and the use of the time-delayed recognition signal to control the latch 616 are related to the circuitry of the frequency converter 612. In the disclosed embodiment, the converter 612 has a phase-lock loop configuration known in the art, so that the pulse burst generated by the scanned patter image must be applied to its input for a brief period of time in which the converter cycles sufficiently to "zero in" on the correct output value. The "enabling" of the latch 616 with the time delayed recognition signal provides the required interval subsequent to pattern recognition so that the track and hold 614 receives the correct converter output value. The counter 640, on the other hand, functions to insure that the target is scanned sufficiently near its center to offset inaccuracies arising from the scanning of too few markings, as may occur, for example, when the pattern is tilted; a correct converter output is thus obtained before disabling of the track and hold.

Although the checker-row target is very easy to construct with the contrasting squares, a disadvantage arises electronically when the target distance is several times the closest distance. The square wave generated by the scanning of such a target has a frequency spectrum comprising a series of odd harmonics which add a degree of ambiguity to the relation of the burst frequency and the target distance, particularly for third harmonics of close targets. It is desirable, therefore, to generate a sinusoidal waveform when the target is scanned. One technique would include the use of pattern markings having sinusoidal density distribution. Alternatively, the problem may be ameliorated by the defocussing of the camera lens but with a loss of precision in detecting when the target is first and last scanned. Accordingly, the preferable technique for generating a sinusoidal waveform is the use of an auxiliary cylindrical lens, with its vertical axis essentially perpendicular to the target pattern, to enhance the uniqueness of the frequency/distance relationship without sacrificing the precision desired in locating the target centroid. The comparative images, and corresponding video signal bursts obtained with and without the use of the auxiliary lens may be seen by reference to FIG. 7.

Figure 7:
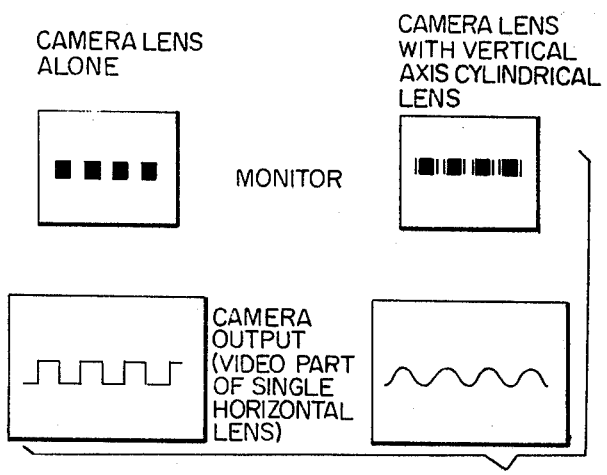
FIG. 7 shows the comparative images and the correponding video signal pulse bursts generated by the scanning of a checkered target with and without the use of an auxiliary cylindrical lens.

FIG. 7 shows the image and corresponding video burst generated by the scanning of a checkered target. The image and signal at the right is derived with the use of a cylindrical lens having its vertical axis just in front of the camera lens. The checker row is out of focus in the horizontal direction, but the top and bottom focus are undisturbed. In practice, a third harmonic reduction of 7dB has been obtained by use of a three diopter cylindrical lens in front of a 16mm camera lens.

Naturally, there are variations in the described embodiments and method which are obvious to one skilled in the art. These changes and modifications may be made without departing from the spirit of the invention as defined by the appended claims.

I claim:

1. A target locator for measuring the distance of a target from a station point comprising:
   a. a target pattern of successive spaced-apart markings having a predetermined spatial relationship with the target;
   b. video signal generating means including
      i. a photosensitive medium,
      ii. optional means located at the station point for imparting a light-value related, electrostatically charged image of the target pattern onto the photosensitive medium when the target is in the viewing plane of the optical means, the image being perspectively scaled with respect to the pattern in at least one direction and in accordance with the target distance from the station point,
      iii. first scanning means for periodically directing a scanning beam over the imaged photosensitive material and along at least one scanning path having a generally parallel relationship with the direction of scaling, the video signal generating means being responsive to a scanned marking image to vary the video signal magnitude, whereby the duration of magnitude variation varies in accordance with the degree of perspective scaling; and
   c. means responsive to the varying duration to generate a signal indicative of the target distance from the station point.

2. The target locator of claim 1 wherein the photosensitive medium is scanned in the general direction of the imaged markings; and
   the video signal generating means generates a pulse burst in response to the scanned markings, the pulses within the burst having a frequency which is related to the perspective scaling of the target image.

3. The target locator of claim 2 wherein the pulse frequency varies inversely with the pitch of the imaged markings, the pitch being perspectively scaled with respect to the target pattern pitch in accordance with the target distance.

4. The target locator of claim 2 including means for generating a burst having a generally sinusoidal waveform.

5. The target locator of claim 4 wherein the optical system includes means defocussing the pattern in a generally parallel direction with the scan to cause the video signal generating means to generate a generally sinusoidal video signal in response to the scanned markings.

6. The target locator of claim 5 wherein the optical system includes a cylindrical lens having its axis generally transverse to the direction of scanning.

7. The target locator of claim 1 including sweep voltage generating means for repeatedly deflecting the scanning beam in a direction essentially perpendicular to the scan path, the sweep voltage means being synchronized with the scanning means to define a field having a plurality of essentially parallel scan paths over the image area of the photoelectric medium;
    first means for sampling and holding the value of sweep voltage when the target marking images are initially detected in the field;
    second means for sampling and holding the value of sweep voltage when the target marking images are last detected in the field; and
    summing means responsive to the first and second sample and holding means for generating a signal indicative of the lateral displacement of the target from the station point.

8. A target locator for measuring the lateral displacement of a target from a longitudinal axis passing through a station point comprising:
    a. a target pattern of successive spaced-apart markings having a predetermined spatial relationship with the target;
    b. a video signal generating means including
        i. a photosensitive medium,
        ii. optical means located at the station point for imparting a light-value related, electrostatically charged image of the target pattern onto the photosensitive medium when the target is in the viewing plane of the optical means,
        iii. first means for periodically directing a scanning beam over the imaged photosensitive material and along at least one scanning path crossing the imaged markings; the video signal generating means being responsive to a scanned marking image to vary the video signal magnitude,
    c. means for moving the scanning beam in an essentially perpendicular direction to the scan path;
    d. means responsive to the video signal generating means to generate a signal indicative of the perpendicular displacement of the scanning beam when the pattern image is scanned.

9. The target locator of claim 8 including sweep voltage generating means for repeatedly deflecting the scanning beam in a direction essentially perpendicular to the scan path, the sweep voltage means being synchronized with the scanning means to define a field having a plurality of essentially parallel scan paths over the image area of the photoelectric medium; and
    first means for sampling the sweep voltage when the pattern marking images are detected in the field and generating a signal indicative of the lateral target displacement.

10. The target locator of claim 8 including sweep voltage generating means for repeatedly deflecting the scanning beam in a direction essentially perpendicular to the scan path, the sweep voltage means being synchronized with the scanning means to define a field having a plurality of essentially parallel scan paths over the image area of the photoelectric medium;
    first means for sampling and holding the value of sweep voltage when the target marking images are initially detected in the field;
    second means for sampling and holding the value of sweep voltage when the target marking images are last detected in the field; and
    summing means responsive to the first and second sampling and hold means for generating a signal indicative of the lateral displacement of the target from the station point.

11. A method for locating a targeted object with respect to a station point comprising the steps of:
    mounting a video camera at the station point;
    placing a target pattern of successive spaced-apart markings in a fixed spactial relationship with the targeted object;
    bringing the target pattern within the viewing field of the camera to cause the camera to generate a series of pulses during its scan of the pattern, and
    generating a first distance signal related to the pulse frequency.

12. The method of claim 11 including the step of orienting the target pattern so that the "fast" scan direction of the camera lies generally transverse to the markings.

13. The method of claim 12 including the additional steps of
    detecting a first value of the vertical deflection voltage related to the scan line at which the target pattern is initially detected;
    detecting a second value of the vertical deflection voltage related to the scan line at which the target is last detected; and
    summing the two values to obtain a signal indicative of the lateral displacement of the target from the robot arm.

14. The method of claim 13 including the step of defocussing the camera along the optical axis in the "fast" scan direction to generate sinusoidal pulses in response to the scanning of the pattern.

* * * * *